United States Patent
Luo et al.

(10) Patent No.: US 10,511,477 B2
(45) Date of Patent: Dec. 17, 2019

(54) WIRELESS DEVICES AND SYSTEMS INCLUDING EXAMPLES OF CONFIGURATION DURING AN ACTIVE TIME PERIOD

(71) Applicant: MICRON TECHNOLOGY, INC., Boise, ID (US)

(72) Inventors: Fa-Long Luo, San Jose, CA (US); Jaime Cummins, Bainbridge Island, WA (US); Tamara Schmitz, Scotts Valley, CA (US); Jeremy Chritz, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 65 days.

(21) Appl. No.: 15/827,460

(22) Filed: Nov. 30, 2017

(65) Prior Publication Data

US 2019/0165999 A1 May 30, 2019

(51) Int. Cl.
*H04L 12/24* (2006.01)
*H04L 29/08* (2006.01)
*H04W 76/28* (2018.01)

(52) U.S. Cl.
CPC ...... *H04L 41/0813* (2013.01); *H04L 41/0823* (2013.01); *H04L 41/0859* (2013.01); *H04L 67/12* (2013.01); *H04W 76/28* (2018.02)

(58) Field of Classification Search
None
See application file for complete search history.

(56) References Cited

U.S. PATENT DOCUMENTS

| 8,526,537 B2 | 9/2013 | Chen et al. |
| 8,854,976 B2 | 10/2014 | Xi et al. |
| 9,433,002 B2 | 8/2016 | Yu et al. |
| 2015/0237635 A1* | 8/2015 | Yu .................. H04L 1/0027 370/311 |

(Continued)

OTHER PUBLICATIONS

'IWRIxxx Radar Digital Front End (DFE)', SWRA550, May 2017, pp. 1-7 (Year: 2017).*

(Continued)

*Primary Examiner* — Ayaz R Sheikh
*Assistant Examiner* — Sori A Aga
(74) *Attorney, Agent, or Firm* — Dorsey & Whitney LLP

(57) ABSTRACT

Examples described herein include methods, devices, and systems which may implement different processing stages for wireless communication in processing units. Such data processing may include a source data processing stage, a baseband processing stage, a digital front-end processing stage, and a radio frequency (RF) processing stage. Data may be received from a sensor of device and then processed in the stages to generate output data for transmission. Processing the data in the various stages may occur during an active time period of a discontinuous operating mode. During the active time period, a reconfigurable hardware platform may allocate all or a portion of the processing units to implement the processing stages. Examples of systems and methods described herein may facilitate the processing of data for 5G (e.g., New Radio (NR)) wireless communications in a power-efficient and time-efficient manner.

24 Claims, 8 Drawing Sheets

(56) References Cited

U.S. PATENT DOCUMENTS

2017/0070966 A1 3/2017 Ganesan et al.
2019/0166000 A1 5/2019 Luo et al.

OTHER PUBLICATIONS

U.S. Appl. No. 16/116,849 titled "Wireless Devices and Systems Including Examples of Configuration During an Active Time Period" filed Aug. 29, 2018, pp. all.
IWR1xxx Radar Digital Front End (DFE), Texas Instruments Application report, SWRA550, May 2017, pp. 1-7.
International search report and the written opinion of the international searching authority for PCT App. No. PCT/US2018/057859 dated Mar. 7, 2019; pp. all.

* cited by examiner ically specific. For example,
WIRELESS DEVICES AND SYSTEMS INCLUDING EXAMPLES OF CONFIGURATION DURING AN ACTIVE TIME PERIOD

BACKGROUND

Digital signal processing for wireless communications, such as digital baseband processing or digital front-end implementations, may be implemented using hardware (e.g. silicon) computing platforms. For example, multimedia processing and digital radio frequency (RF) processing may be accomplished by an application-specific integrated circuit (ASIC) which may implement a digital front-end for a wireless transceiver. A variety of hardware platforms are available to implement digital signal processing, such as the ASIC, a digital signal processor (DSP) implemented as part of a field-programmable gate array (FPGA), or a system-on-chip (SoC). However, each of these solutions often requires implementing customized signal processing methods that are hardware-implementation specific. For example, a digital signal processor may implement a specific portion of digital processing at a cellular base station, such as filtering interference based on the environmental parameters at that base station. Each portion of the overall signal processing performed may be implemented by different, specially-designed hardware, creating complexity.

Moreover, there is interest in moving wireless communications to "fifth generation" (5G) systems. 5G offers promise of increased speed and ubiquity, but methodologies for processing 5G wireless communications have not yet been set. In some implementations of 5G wireless communications, "Internet of Things" (IoT) devices may operate on a narrowband wireless communication standard, which may be referred to as Narrow Band IoT (NB-IoT). For example, Release 13 of the 3GPP specification describes a narrowband wireless communication standard.

DETAILED DESCRIPTION

Figure 1:
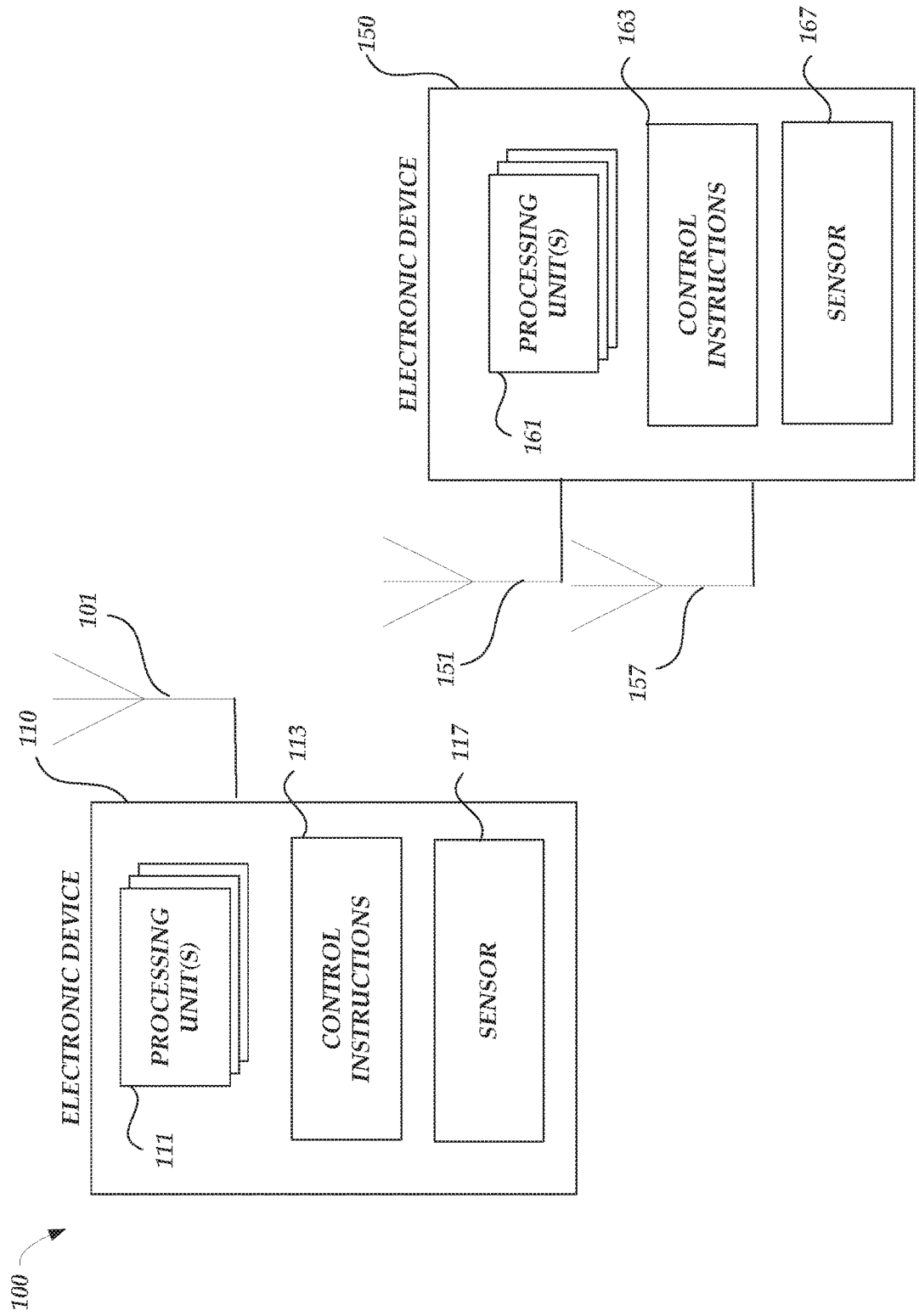
FIG. 1 is a block diagram of a computing system arranged in accordance with examples described herein.

Examples described herein include wireless devices and systems which may implement processing stages for IoT devices. An IoT device, as compared to conventional wireless devices, may include several aspects such as low power consumption, smaller chip size, more limited amounts of data transmission, and infrequent data transmission. With such aspects, several applications for IoT devices may include "smart metering" (e.g., monitoring for electricity, gas and water services); "smart cities" (e.g., monitoring for streetlights, parking and waste management, facility management services); alarms (e.g., intruder and fire alarms for homes & commercial properties); personal device applications (e.g., a wearable health monitory device); and "smart logistics" (e.g. tracking and/or monitoring of persons, animals or objects).

In some examples, an IoT device may include varying stages for data processing. Such data processing may include a source data processing stage, a baseband processing stage, a digital front-end processing stage, and a radio frequency (RF) processing stage. Data may be received from a sensor of an IoT device and then processed in the stages to generate output data for transmission. The data may be transmitted at an antenna at a specific radio frequency (RF) associated with the antenna. Processing the data in the various stages may occur during an active time period, for example, when a processor is powered in an active mode. An active mode includes when the device is powered on to process data received from a sensor, when the device is not powered off, or when the device is not in a low-power state (e.g., a sleep mode). Transmitting the data, after processing, may occur in the active time period a different period than the active time period. For example, the data may be transmitted via the antenna when the processor is powered down in a sleep mode, for example, in a sleep mode to conserve energy or utilize power for data transmission. Active and inactive time periods may be cyclic and/or configurable. Devices may operate in active or inactive time periods according to a discontinuous reception (DRX) or discontinuous transmission (DTX) mode, which may be configurable.

During the active time period, a reconfigurable hardware platform may allocate all or a portion of the processing units to implement/perform the processing stages. In an example, the reconfigurable hardware platform may implement all the processing units in a first time period of the active period to perform the source data processing stage; and, after processing of the data at that stage, it may implement all the processing units in a second time period of the active time period to perform the baseband processing stage. Or, depending on the processing needs, during the second time period, the reconfigurable hardware platform may implement only a portion of the processing units. Various examples are described and contemplated herein. The reconfigurable hardware platform may allocate and implement varying processing stages according to a configuration. Control instructions may utilize a configuration (e.g., a configuration selection) to allocate respective processing units of the reconfigurable hardware platform for processing of input data to generate output data. In an example, the control instructions may provide a configuration and set a flag associated with output data for another processing stage, such that when that data and flag is retrieved from memory, another processing stage may process that data as input data for its stage. A sequence of configuration may be specified by the control instructions such that, during execution, a configuration is selected depending on which processing stage has most recently executed. In another example, control instructions that include instructions for allocating processing units into various configurations may be stored on a non-transitory computer readable medium, and once a configuration mode is selected, such instructions may be provided to instruction registers or caches for execution in the respective processing units. Such instruction provision can be referred to as multiple-task management.

Generally described, a reconfigurable hardware platform may generate output data at a first processing stage for a first configuration and load additional instruction sets, based on a second configuration, into respective processing units to perform a second processing stage. In performing the second wireless processing stage, the reconfigurable hardware platform may generate a corresponding output data based on mixing the intermediate processing result with coefficient data specific to the second wireless processing stage. Generally, any processing stage can be represented by coefficient data, which, in turn, may be utilized to mix input data or an intermediate processing result to generate, respectively, the output data of that processing stage. Examples of processing stages are described herein.

A hardware platform that can change the provision of control instructions to certain processing units, for example, while executing instructions on certain other processing units may be referred to as reconfigurable. A reconfigurable hardware platform, such as a reconfigurable fabric (e.g., an integrated circuit having the functionality of a reconfigurable hardware platform), may change and/or update instructions sent to certain processing units. Some processing units on the reconfigurable hardware platform may be executing or performing a certain functionality, such as adding or accumulating, and the processing units may be reconfigured to receive different instructions that can alter or change their respective functionalities. Accordingly, a processing unit that is executing instructions to add operands may be changed to a processing unit that is executing instructions to accumulate operands. Such a reconfigurable hardware platform can increase the rate of instruction execution and improve the efficiency of instruction set execution, such as providing instruction sets to certain processing units that are available. Such advantages related to rate of instruction execution or efficiency of instruction set execution may offer can lead to faster processing time of reconfigurable hardware platforms over a conventional ASIC or a specially-configured digital signal processing (DSP) unit.

A reconfigurable hardware platform may mix coefficient data with input data (e.g., input data from a sensor or output data from another processing stage) to implement a processing stages to generate output data for that processing stage. The coefficient data may be any data that is specific to a processing stage. A processing stage may be associated with specific signal processing techniques such that the coefficient data corresponds to a non-linear mapping of the input data being processed according to those specific signal processing techniques. The output data may be an approximation of the input data being processed in hardware (e.g., an FPGA) specifically-designed to implement the processing stage that the coefficients correspond to. Depending on whether the output data is to be processed in an additional processing stage, some output data may be referred to as intermediate output data. In an example, an FPGA may be designed to implement various signal processing techniques, including scrambling, error-correction coding, inner coding, interleaving, frame adaptation, modulation, multi-user access coding, inverse Fourier transforms, or guard interval addition. Coefficients associated with the baseband processing stage may be utilized such that the output data is an approximation of input data being processed according to such an FPGA.

Advantageously in some examples, the systems and methods described herein may operate according to multiple standards and/or with multiple applications, including changes or upgrades to each thereto; in contrast to the inflexible framework of an ASIC-based solution. In some examples, as discussed herein in terms of processing units implementing multiplication, addition, or accumulation functionalities, examples of the systems and methods described herein may operate on a power-efficient framework, consuming minimal power with such functionalities; in contrast to a power-hungry framework of a FPGA/DSP-based solution. In some examples, systems and methods described herein may operate with a substantially integrated framework from a unified programming language perspective; in contrast to the various programming languages needed for integration of a SoC solution that may pose programming challenges when implementing heterogeneous interfaces for control units, computational units, data units and accelerator units.

FIG. 1 is a block diagram of a wireless communications system arranged in accordance with examples described herein. System 100 includes electronic device 110 and electronic device 150. The electronic device 110, coupled to the antenna 101, includes a sensor 117. The electronic device 110, which may be implemented on a reconfigurable fabric, includes processing units 111 and control instructions 113. The control instructions 113 may be stored on non-transitory computer readable media, for example, as encoded executable instructions, which, when executed by a processor (e.g. a reconfigurable fabric), is configured to cause the electronic device 110 to perform certain operations described herein. The electronic device 110 may be in communication with antennas 101 to transmit or receive wireless communication signals, for example, modulated RF signals on a specific wireless band.

Figure 3:
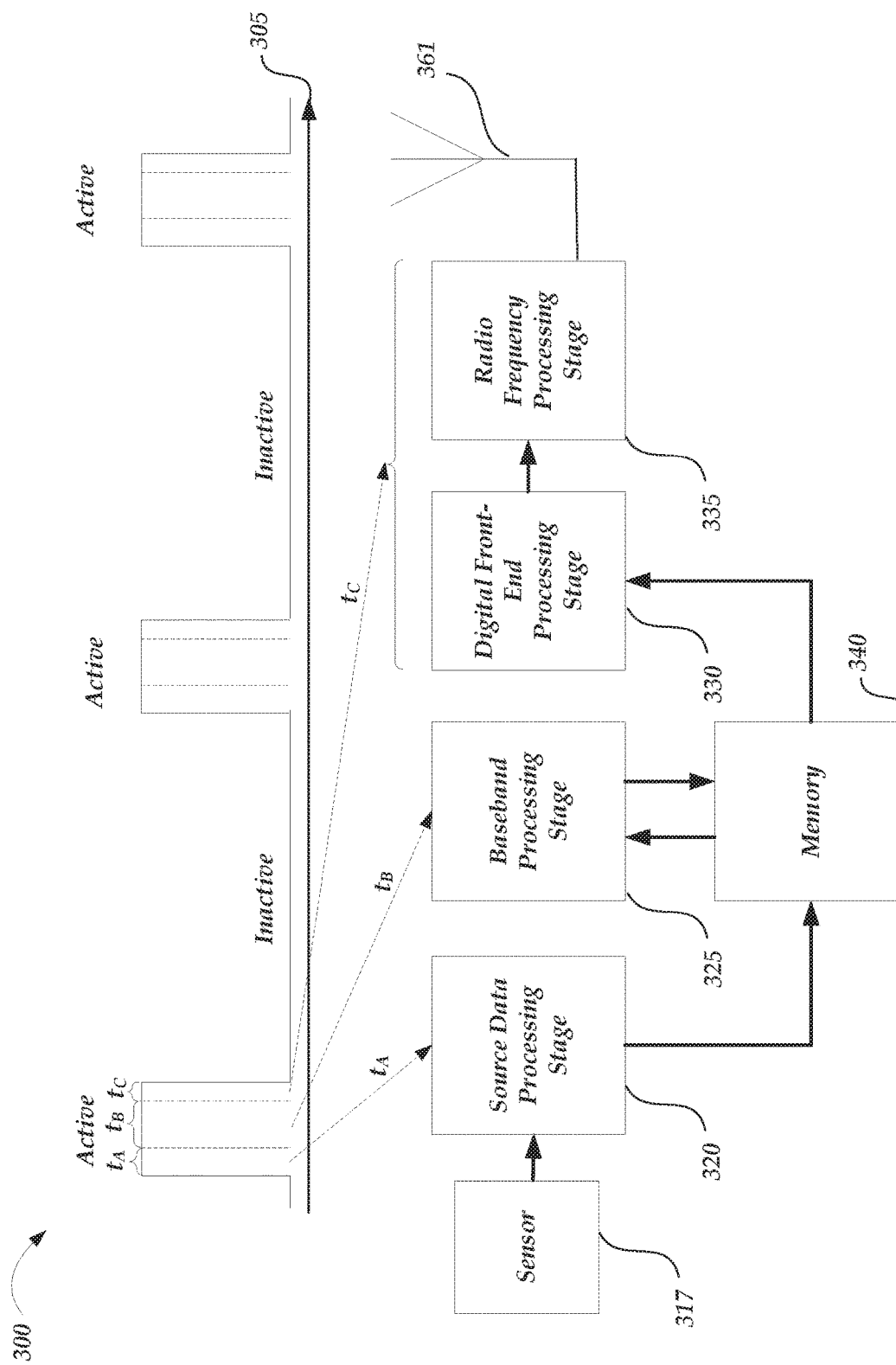
FIG. 3 is a timing diagram of a computing system arranged in accordance with examples described herein.

The electronic device 150, coupled to the antennas 151, 157, includes a sensor 167. The electronic device 150, which may also be implemented on a reconfigurable fabric, includes processing units 161 and control instructions 163. The control instructions 163 may be stored on non-transitory computer readable media, for example, as encoded executable instructions, which, when executed by a processor (e.g. a reconfigurable fabric), is configured to cause the electronic device 150 to perform certain operations described herein. The electronic device 150 may be transmitting or receiving on the same wireless band as the electronic device 110 or on a different wireless band. Control instructions 113, 163 may configure the respective electronic devices 110, 150 for specific configurations. Control instructions 113 and 163 may be locally implemented on each electronic device 110, 150. The electronic devices 110, 150 may utilize the respective control instructions 113, 163 to control the respective antenna 101 and antennas 151, 157; and, to control the respective sensors 117, 167. In other examples, fewer, additional, and/or different components may be provided. For example, while described above with each electronic device including a single sensor, in other examples, multiple sensors may be included in each electronic device 110, 150. Or, as depicted in FIG. 3, either electronic device 110 or electronic device 150 may include a memory such as memory 340.

Electronic devices described herein, such as electronic device 110 and electronic device 150 shown in FIG. 1 may be implemented using generally any electronic device for which wireless communication capability is desired. For example, electronic device 110 and/or electronic device 150 may be implemented using a mobile phone, smartwatch (or other wearable device), computer (e.g. server, laptop, tablet, desktop), or radio. In some examples, the electronic device 110 and/or electronic device 150 may be incorporated into and/or in communication with other apparatuses for which communication capability is desired, including devices associated with the Internet of Things (IoT), such as but not limited to, an automobile, airplane, helicopter, appliance, tag, camera, or other device. While not explicitly shown in FIG. 1, electronic device 110 and/or electronic device 150 may include any of a variety of components in some examples, including, but not limited to, memory, input/output devices, circuitry, processing units (e.g. processing elements and/or processors), or combinations thereof.

The electronic device 110 and the electronic device 150 may each include multiple antennas. For example, the electronic device 110 and electronic device 150 may each have more than two antennas. While electronic device 110 includes one antenna and electronic device 150 includes two antennas, generally any number of antennas may be used including 2, 3, 4, 5, 6, 7, 8, 9, 10, 11, 12, 13, 14, 15, 16, 32, 64, or 96 antennas. Other numbers of antennas may be used in other examples. In some examples, the electronic device 110 and electronic device 150 may have a same number of antennas. In other examples, the electronic device 110 and electronic device 150 may have different numbers of antennas, as shown in FIG. 1. Generally, systems described herein may include MIMO systems.

MIMO systems generally refer to systems including one or more electronic devices which transmit transmissions using multiple antennas and one or more electronic devices which receive transmissions using multiple antennas. In some examples, electronic devices may both transmit and receive transmissions using multiple antennas. Some example systems described herein may be "massive MIMO" systems. Generally, massive MIMO systems refer to systems employing greater than a certain number (e.g. 96) antennas to transmit and/or receive transmissions. As the number of antennas increase, so to generally does the complexity involved in accurately transmitting and/or receiving transmissions. Although two electronic devices (e.g. electronic device 110 and electronic device 150) are shown in FIG. 1, generally the system 100 may include any number of electronic devices.

Each of the processing unit(s) 111, 161 may be implemented using one or more operand processing units, such as an arithmetic logic unit (ALU), a bit manipulation unit, a multiplication unit, an accumulation unit, an adder unit, a look-up table unit, a memory look-up unit, or any combination thereof. In some examples, each of the processing unit(s) 111, 161 may include circuitry, including custom circuitry, and/or firmware for performing functions described herein. For example, circuitry can include multiplication unit/accumulation units for performing the described functions, as described herein. Each of the processing unit(s) 111, 161 can be implemented as a microprocessor or a digital signal processor (DSP), or any combination thereof. For example, processing unit(s) 111, 161 can include levels of caching, such as a level one cache and a level two cache, a core, and registers. Examples of processing unit(s) 111, 161 are described herein, for example with reference to FIG. 2.

Sensor 117 or sensor 167 may each individually be any type of sensor for monitoring and/or detecting changes in environmental conditions of the respective electronic device 110 or electronic device 150, which may be referred to as environmental characteristics of each respective electronic device 110 or electronic device 150. For example, sensor 117 or sensor 167 may monitor environmental conditions of their surroundings utilizing mechanisms of the sensor to detect or monitor changes to that environment. Various detecting mechanism may be utilized by the sensors, 117, 167 including, but not limited to mechanisms that are electrical, chemical, mechanical, or any combination thereof. For example, the sensor 117 may detecting changes in a road or building structure utilizing a mechanical actuator that translate energy into an electrical signal. As another example, sensor 167 may detect changes in a sugar level of the blood utilizing a chemical sensor that translates energy into an electrical signal. Various types of sensors, for example any type of sensor that may be utilized in an electronic device and coupled to a processing unit 111, 161.

Figure 2:
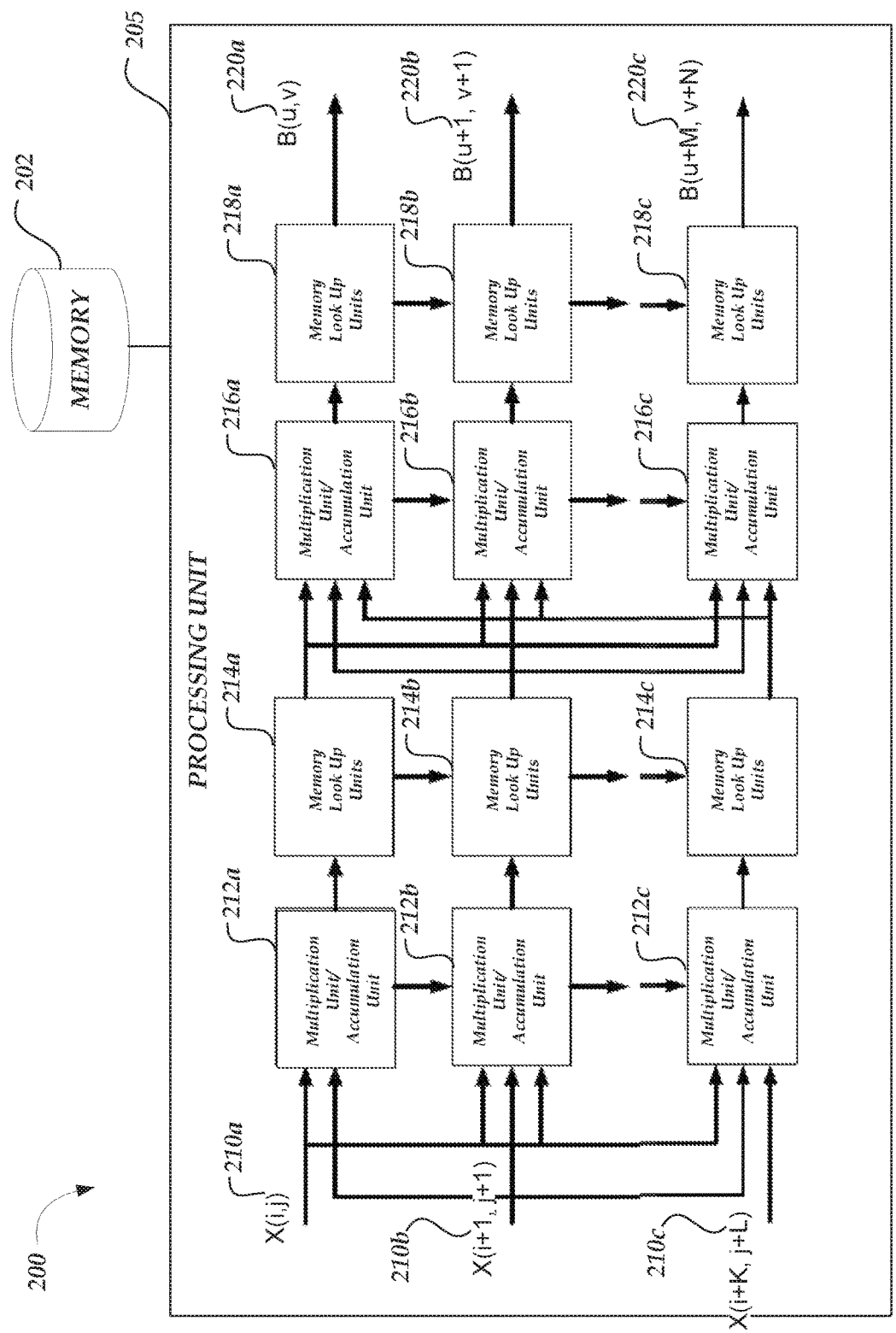
FIG. 2 is a block diagram of a computing system arranged in accordance with the example of FIG. 1.

FIG. 2 is a block diagram of a processing unit 205 arranged in a computing system 200 in accordance with examples described herein. The system 200 may be the electronic device 110 or electronic device 150, for example. The processing unit 205 may receive input data (e.g. X (i,j)) 210a-c from such a computing system. In some examples, the input data 210a-c may be input data, such as data received from a sensor or data stored in the memory 202. For example, data stored in the memory 202 may be output data generated by one or more processing units implementing another processing stage. The processing unit 205 may include multiplication unit/accumulation units 212a-c, 216a-c and memory lookup units 214a-c, 218a-c that, when mixed with coefficient data retrieved from the memory 202, may generate output data (e.g. B (u,v)) 220a-c. In some examples, the output data 220a-c may be utilized as input data for another processing stage or as output data to be transmitted via an antenna.

In implementing one or more processing units 205, a computer-readable medium at an electronic device 110, 150 may execute respective control instructions 113 and control instructions 163 to perform operations within a processing unit 205. For example, the control instructions 113 provide instructions to the processing unit 205, that when executed by the computing device 110, cause the processing unit 205 to configure the multiplication units 212a-c to multiply input data 210a-c with coefficient data and accumulation units 216a-c to accumulate processing results to generate the output data 220a-c.

The multiplication unit/accumulation units 212a-c, 216a-c multiply two operands from the input data 210a-c to generate a multiplication processing result that is accumulated by the accumulation unit portion of the multiplication unit/accumulation units 212a-c, 216a-c. The multiplication unit/accumulation units 212a-c, 216a-c adds the multiplication processing result to update the processing result stored in the accumulation unit portion, thereby accumulating the multiplication processing result. For example, the multiplication unit/accumulation units 212a-c, 216a-c may perform a multiply-accumulate operation such that two operands, M and N, are multiplied and then added with P to generate a new version of P that is stored in its respective multiplication unit/accumulation units. The memory look-up units 214a-c, 218a-c retrieve coefficient data stored in memory 202. For example, the memory look-up unit can be a table look-up that retrieves a specific coefficient. The output of the memory look-up units 214a-c, 218a-c is provided to the multiplication unit/accumulation units 212a-c, 216a c that may be utilized as a multiplication operand in the multiplication unit portion of the multiplication unit/accumulation units 212a-c, 216a-c. Using such a circuitry arrangement, the output data (e.g. B (u,v)) 220a-c may be generated from the input data (e.g. X (i,j)) 210a-c.

In some examples, coefficient data, for example from memory 202, can be mixed with the input data X (i,j) 210a-c to generate the output data B (u,v) 220a-c. The relationship of the coefficient data to the output data B (u,v) 220a-c based on the input data X (i,j) 210a-c may be expressed as:

$$B(u, v) = f\left(\sum_{m,n}^{M,N} a''_{m,n} f\left(\sum_{k,l}^{K,L} a'_{k,l} X(i+k, j+l)\right)\right) \quad (1)$$

where $a_{k,l}'$, $a_{m,n}''$ are coefficients for the first set of multiplication/accumulation units 212a-c and second set of multiplication/accumulation units 216a-c, respectively, and where f(•) stands for the mapping relationship performed by the memory look-up units 214a-c, 218a-c. As described above, the memory look-up units 214a-c, 218a-c retrieve coefficients to mix with the input data. Accordingly, the output data may be provided by manipulating the input data with multiplication/accumulation units using a set of coefficients stored in the memory associated with a desired wireless protocol. The resulting mapped data may be manipulated by additional multiplication/accumulation units using additional sets of coefficients stored in the memory associated with the desired wireless protocol. The sets of coefficients multiplied at each stage of the processing unit 205 may represent or provide an estimation of the processing of the input data in specifically-designed hardware (e.g., an FPGA).

Further, it can be shown that the system 200, as represented by Equation 1, may approximate any nonlinear mapping with arbitrarily small error in some examples and the mapping of system 200 is determined by the coefficients $a_{k,l}'$, $a_{m,n}''$. For example, if such coefficient data is specified, any mapping and processing between the input data X (i,j) 210a-c and the output data B (u,v) 220a-c may be accomplished by the system 200. Such a relationship, as derived from the circuitry arrangement depicted in system 200, may be used to train an entity of the computing system 200 to generate coefficient data. For example, using Equation (1), an entity of the computing system 200 may compare input data to the output data to generate the coefficient data.

In the example of system 200, the processing unit 205 mixes the coefficient data with the input data X (i,j) 210a-c utilizing the memory look-up units 214a-c, 218a-c. In some examples, the memory look-up units 214a-c, 218a-c can be referred to as table look-up units. The coefficient data may be associated with a mapping relationship for the input data X (i,j) 210a-c to the output data B (u,v) 220a-c. For example, the coefficient data may represent non-linear mappings of the input data X (i,j) 210a-c to the output data B (u,v) 220a-c. In some examples, the non-linear mappings of the coefficient data may represent a Gaussian function, a piece-wise linear function, a sigmoid function, a thin-plate-spline function, a multi-quadratic function, a cubic approximation, an inverse multi-quadratic function, or combinations thereof. In some examples, some or all of the memory look-up units 214a-c, 218a-c may be deactivated. For example, one or more of the memory look-up units 214a-c, 218a-c may operate as a gain unit with the unity gain. In such a case, the instructions 113 or instructions 163 may be executed to facilitate selection of a unity gain processing mode for some or all of the memory look-up units 214a-c, 218a-c.

Each of the multiplication unit/accumulation units 212a-c, 216a-c may include multiple multipliers, multiple accumulation unit, or and/or multiple adders. Any one of the multiplication unit/accumulation units 212a-c, 216a may be implemented using an ALU. In some examples, any one of the multiplication unit/accumulation units 212a-c, 216a-c can include one multiplier and one adder that each perform, respectively, multiple multiplications and multiple additions. The input-output relationship of a multiplication/accumulation unit 212, 216 may be represented as:

$$B_{out} = \sum_{i=1}^{I} C_i * B_{in}(i) \quad (2)$$

where "I" represents a number to perform the multiplications in that unit, $C_i$ the coefficients which may be accessed from a memory, such as memory 202, and $B_{in}(i)$ represents a factor from either the input data X (i,j) 210a-c or an output from multiplication unit/accumulation units 212a-c, 216a-c. In an example, the output of a set of multiplication unit/accumulation units, $B_{out}$, equals the sum of coefficient data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of coefficient data, $C_i$ multiplied by input data.

FIG. 3 is a timing diagram of an electronic device 300 operating in accordance with examples described herein. The electronic device 300 includes a sensor 317 and antenna 361. The electronic device 300 may be configured to implement various configurations, with each configuration allocating processing units to perform a portion of the data processing on data received from the sensor 317 and to generate output data to be transmitted at the antenna 361 as an RF signal. Electronic devices being implemented as electronic device 300, which may include processing units (e.g., processing units 111 of electronic device 110 or processing units 161 of the electronic device 150), can be configured to operate as varying processing stages during different time periods of an active time period. The active time periods may include the time periods $t_A$, $t_B$, and $t_C$. An active time period may occur when a processor is powered in an active mode. An active mode includes when the device is powered on to process data received from a sensor, when the device is not powered off, or when the device is not in a low-power state. As depicted, active time periods do not occur during inactive time periods. Inactive time periods may include when the device 300 is powered off or when the device 300 is in the low-power state (e.g., a sleep mode). The timing diagram of FIG. 3 depicts the device operating over a timeline 305 including multiple time periods: some active time periods during an active mode and some inactive time periods.

During the timeline 305, which may be a timeline for a DRX or DTX mode of operation, the device 300 may be configured to operate in varying processing stages during specific time periods of the active time period. During the $t_A$ time period, the electronic device 300 may be configured to include a source data processing stage 320. The source data processing stage 320 may receive data from the sensor 317 and generate output data to be stored in the memory 340. The source data processing stage 320 may include pre-processing for the data received from the sensors. Such pre-processing may include noise reduction, sampling-converting, filtering, compression or coding, feature extraction or feature transformation.

As described herein, the electronic device 300 may execute control instructions that implement a configuration for the processing units, for example, configuration A for the $t_A$ time period. In accordance with that configuration, the processing units of the electronic device 300 implement the source data processing stage 320 to receive the data from the sensor 317 and generate output data to be stored in the memory 340. In the context of the example of FIG. 2, the data received in the processing units of the electronic device 300 may be input data 210a-c (e.g. X (i,j)). The source data processing stage 320 mixes the input data 210a-c with coefficient data specific to the source data processing stage 320 to generate the output data 220a-c (e.g. B (u,v)). The specific coefficient data may be stored in the memory 340. Coefficients associated with the source data processing stage 320 may be utilized such that the output data is an approximation of input data being processed according to such a source data processing stage being implemented in a signal processor, such as an FPGA. In the example of FIG. 3, the output data from the source data processing stage 320 may be referred to as first intermediate output data.

Along the timeline 305, the device 300 may be further configured to operate in another processing stage during the active time period. During the to time period, the electronic device 300 may be configured to include a baseband processing stage 325. The baseband processing stage 325 may include various baseband signal processing techniques, including but not limited to: scrambling, error-correction coding, inner coding, interleaving, frame adaptation, modulation, multi-user access coding, filter processing, inverse Fourier transforms, and/or guard interval addition. Coding may include Turbo coding, polar coding, or low-density parity-check (LDPC) coding. Modulation may include sparse code multiple access (SCMA), orthogonal frequency division multiple access (OFDMA), multi-user shared access (MUSA), non-orthogonal multiple access (NOMA), and/or polarization division multiple access (PDMA). Multi-user access coding may include Filtered-Orthogonal Frequency Division Multiplexing (F-OFDM), Filter-Bank Frequency Division Multiplexing (FB-OFDM), Spectrally Efficient Frequency Division Multiplexing (SEFDM), and/or Filter Bank Multicarrier (FBMC).

For Massive MIMO implementations, additional baseband processing may include pre-coding estimation and various other functionalities associated with Massive MIMO. Filter processing may include various types of digital filters, such as a finite impulse response (FIR) filter, a poly-phase network (PPN) filter, and/or $QQ^{-1}$ filter, which may refer to a filter that adjusts for compression and decompression of data.

As described herein, the electronic device 300 may execute control instructions that implement a configuration for the processing units, for example, configuration B for the $t_B$ time period. In accordance with that configuration B, the processing units of the electronic device 300 implement the baseband processing stage 325 to receive input data from the memory 340 and generate output data to be stored in the memory 340. The processing units implementing configuration B can include some or all of the processing units that had implemented configuration A for the $t_A$ time period. Accordingly, the electronic device 300 may efficiently utilize hardware resources (e.g., processing units) in each time period, thereby avoiding the disadvantages of other processing systems/techniques that can include additional hardware or specially-designed hardware for the signal processing implemented in the source data processing stage 320 and baseband processing stage 325. The electronic device 300 may implement the source data processing stage 320 and baseband processing stage 325 with a lower power consumption (e.g., only operating in active time period) and utilizes less die space on a silicon chip than conventional signal processing systems and techniques that can include additional hardware or specially-designed hardware.

For the baseband processing stage 325, the input data retrieved from the memory 340 may be the output data generated by the source data processing stage 320 and stored in the memory 340. In the context of the example of FIG. 2, the data retrieved from the memory 340 input to the processing units implementing the baseband processing stage 325 may correspond to input data 210a-c (e.g. X (i,j)). The baseband processing stage 325 mixes the input data 210a-c with coefficient data specific to the source data processing stage 320 to generate the output data 220a-c (e.g. B (u,v)). The specific coefficient data may be stored in the memory 340. Coefficients associated with the baseband processing stage may be utilized such that the output data is an approximation of input data being processed according to such a baseband processing stage being implemented in a signal processor, such as an FPGA. In the example of FIG. 3, the output data from the baseband processing stage 325 may be referred to as second intermediate output data.

Along the timeline 305, the device 300 may be further configured to operate in additional processing stages during the active time period. During the $t_C$ time period, the electronic device 300 may be configured to include a digital front-end processing stage 330 and a radio frequency (RF) processing stage 335. The digital front-end processing stage 330 may include estimated processing of a wireless transmitter or a wireless receiver. The digital front-end processing stage 330 may include various functionalities for operating as a digital front-end transmitter or receiver, such as: an analog-to-digital conversion (ADC) processing, digital-to-analog (DAC) conversion processing, digital up conversion (DUC), digital down conversion (DDC), direct digital synthesizer (DDS) processing, DDC with DC offset compensation, digital pre-distortion (DPD), peak-to-average power ratio (PAPR) determinations, crest factor reduction (CFR) determinations, pulse-shaping, image rejection, delay/gain/imbalance compensation, noise-shaping, numerical controlled oscillator (NCO), and/or self-interference cancellation (SIC).

As described herein, the electronic device 300 may execute control instructions that implement a configuration for the processing units, for example, configuration C for the $t_C$ time period. In accordance with that configuration C, the processing units of the electronic device 300 implement the digital front-end processing stage 330 to receive input data from the memory 340 and generate output data that is outputted to the RF processing stage 335. The processing units implementing configuration C can include some or all of the processing units that had implemented configuration A for the $t_A$ time period and/or configuration B for the $t_B$ time period. The electronic device 300 may implement the digital front-end processing stage 330 and the RF processing stage 335 with a lower power consumption (e.g., only operating in active time period) and utilizes less die space on a silicon chip than conventional signal processing systems and techniques that can include additional hardware or specially-designed hardware.

For digital front-end processing stage 330, the input data retrieved from the memory 340 may be the output data generated by the baseband processing stage 325 and stored in the memory 340. In the context of the example of FIG. 2, the data retrieved from the memory 340 input to the processing units implementing the digital front-end processing stage 330 may correspond to input data 210a-c (e.g. X (i,j)). The digital front-end processing stage 330 mixes the input data 210a-c with coefficient data specific to the source data processing stage 320 to generate the output data 220a-c (e.g. B (u,v)). The specific coefficient data may be stored in the memory 340. Coefficients associated with the digital front-end processing stage may be utilized such that the output data is an approximation of input data being processed according to such a digital front-end processing stage being implemented in a signal processor, such as an FPGA.

Further to configuration C, the processing units of the electronic device 300 implement the RF processing stage 335 to receive input data from the digital front-end processing stage 330 and generate output data that is sent to the antenna 361 for an RF transmission. In the example of FIG. 3, the output data from the digital front-end processing stage 330 and the RF processing stage 335 may be referred to as third intermediate output data. The RF processing stage 335 may include further processing of the input data as a signal in an analog domain to configure such a signal for input to a power amplifier (PA) and antenna 361. A signal may be output from the RF processing stage 335 to be transmitted as an analog RF transmission via the antenna 361. The signal to be transmitted as an analog RF transmission via the antenna 361 may include the output data referred to as the final output data. Such a transmission may occur during an inactive time period of the electronic device 300. In some implementations, the signal may initially be sent to a PA (not depicted) before proceeding for transmission to the antenna 361.

In some examples, the control instructions of the electronic device 300 may execute commands that compare a clock signal, generated from a clock circuit of the electronic device 300, with processing times during each time periods $t_A$, $t_B$, and $t_C$ and generate a configuration selection according to the comparison of processing times. The configuration selection may specify which of the processing stages the electronic device 300 is to perform. In the context of FIG. 1, a computer readable-media executing the control instructions 113 or control instructions 163 may continuously evaluate processing times at the respective electronic devices 110, 150 to determine whether a processing time for a configuration has started and/or elapsed. If a configuration has elapsed or an indication is received regarding a start of the active time period, the control instructions 113 or control instructions 163 may provide a configuration to be executed by the processing units 111, 161. The provided configuration may include a timestamp indicating a start of the configuration and/or a timestamp indicating an end of that configuration. In some implementations, the start and/or end timestamps of a provided configuration may correspond to a start or end of the active time period. In accordance with that provided configuration, processing units 111, 161 of the respective electronic devices 110, 150 may be allocated to a corresponding processing stage, for example, by configuring the processing units for a configuration in retrieving coefficient data from a memory for that corresponding processing stage.

Execution of the control instructions 113 or control instructions 163 may include comparing a completion time of a configuration to the clock signal. If the processing time of the respective electronic devices 110, 150 is equal or greater than the completion time of that configuration, then, during execution of the control instructions 113 or control instructions 163, a determination may be made that processing units 111, 163 are to be allocated to another processing stage. In such a case, as described herein, execution of the control instructions 113 or control instructions 163 may allocate some of the respective processing units 111, 163 to perform that other processing stage. The control instructions 113 or control instructions 163 may utilize a configuration selection to allocate respective processing units of the reconfigurable hardware platform for processing of input data to generate output data. In an example, the control instructions 113 or control instructions 163 may provide a configuration and set a flag associated with output data for another processing stage, such that when that data and flag is retrieved from memory, another processing stage may process that data as input data for its stage. A sequence of configurations may be specified by the control instructions 113 or control instructions 163 such that, during execution, a configuration is selected depending on which processing stage has most recently executed.

Figure 4:
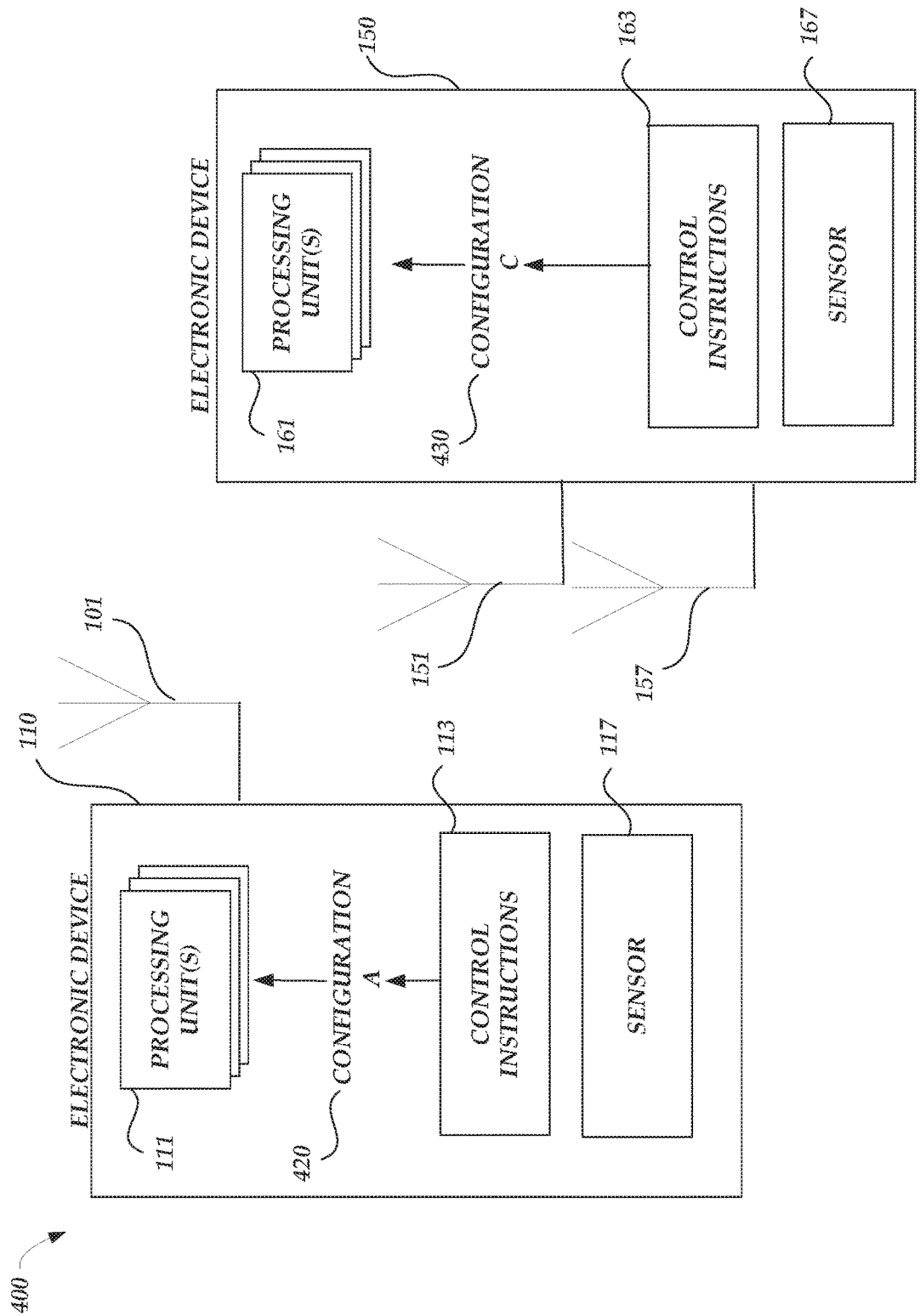
FIG. 4 is a block diagram of a computing system arranged in accordance with examples described herein.

FIG. 4 is a block diagram of a computing system 400 arranged in accordance with some of the configurations described in FIG. 3. The electronic device 110 of the computing system 400 may receive a configuration A selection 420 that is provided by the control instructions 113. A configuration A selection 420 may specify that the processing units 111 are to be configured as the source data processing stage 320 for a time period $t_A$. In some examples, execution of the control instructions 113 may include allocation of the one or more processing unit(s) 111 of a reconfigurable hardware platform to operate according to the configuration A. Execution of the control instructions 113 may include loading instruction sets into the allocated one or more processing unit(s) 111 that specify mixing input data (e.g., an input data stream) with coefficient data associated with the configuration A. The one or more processing unit(s) 111, implemented as processing unit 205, may retrieve, from a memory of the electronic device 110 (e.g., memory 340) or an external memory, the coefficient data associated with the configuration A.

The electronic device 150 of the computing system 400 may receive a configuration C selection 430 that is provided by the control instructions 163. A configuration C selection 430 may specify that the processing units 161 are to be configured as the digital front-end processing stage 330 and the radio frequency (RF) processing stage 335 for a time period $t_C$. In some examples, execution of the control instructions 163 may include allocation of the one or more processing unit(s) 161 of a reconfigurable hardware platform to operate according to the configuration C. Execution of the control instructions 163 may include loading instruction sets into the allocated one or more processing unit(s) 161 that specify mixing input data (e.g., an input data stream) with coefficient data associated with the configuration C. The one or more processing unit(s) 161, implemented as processing unit 205, may retrieve, from a memory of the electronic device 150 (e.g., memory 340) or an external memory, the coefficient data associated with the configuration C.

In some implementations, the active time period at device 150 and device 110 may be different time periods. The active time period of each device 110, 150 may correspond to the same active time period, with different lengths of each time periods $t_A$, $t_B$, and $t_C$, depending on the processing demands of each electronic device 110, 150. For example, the electronic device 150 may include a longer time period to for baseband processing stage 325 than the time period $t_B$ of the electronic device 110, due to increased processing time needed for MIMO applications, such that portions of a signal may be transmitted via antennas 151, 157 of the device 150.

Figure 5:
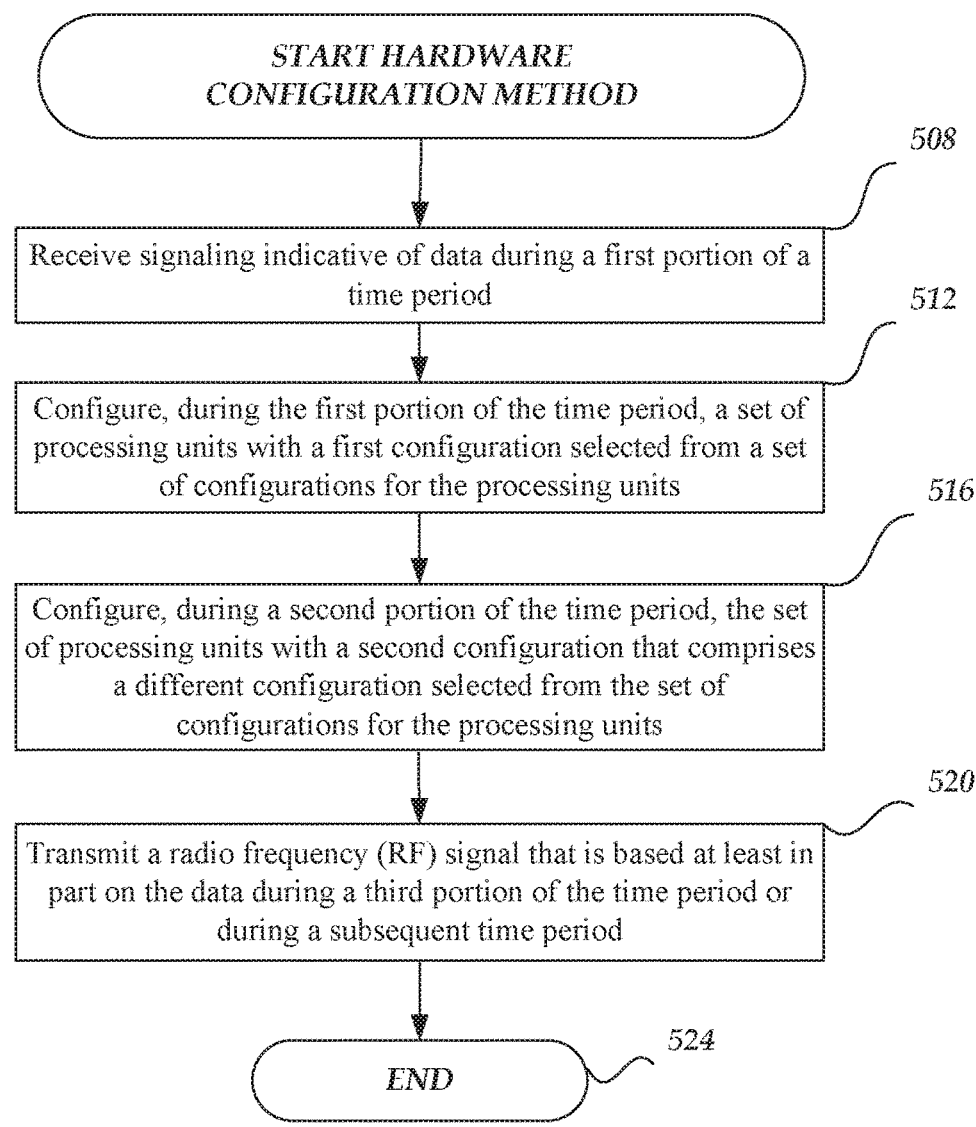
FIG. 5 is a flowchart of a method arranged in accordance with examples described herein.

FIG. 5 is a flowchart of a method 500 in accordance with examples described herein. Example method 500 may be implemented using, for example, computing system 100 in FIG. 1, computing system 200 in FIG. 2, electronic device 300 in FIG. 3, computing system 400 in FIG. 4, or any system or combination of the systems depicted in FIGS. 1-4 described herein. In some examples, the blocks in example method 500 may be performed by a computing system such as an electronic device 300 of FIG. 3 implementing processing units in the hardware platforms (e.g., a reconfigurable fabric) therein as a processing unit 205 of FIG. 2. The operations described in blocks 508-524 may also be stored as control instructions in a computer-readable medium at an electronic device 110, 150, or 300, such as control instructions 113, control instructions 163, or memory 340. In some examples, various hardware platforms may implement the method 500, such as an ASIC, a DSP implemented as part of a FPGA, or a system-on-chip.

Example method 500 may begin the hardware configuration method. At block 508, the method 500 includes receiving signaling indicative of data during a first portion of a time period. For example, the signaling indicative of data may be processed sensor data from the sensor 117 stored in the memory 340. The time period may be an active time period of a hardware platform. For example, the devices 110, 150 may operate in active time period according to a discontinuous reception (DRX) or discontinuous transmission (DTX) mode.

At block 512, the method 500 includes configuring, during the first portion of the time period, a set of processing units with a first configuration selected from a set of configurations for the processing units. Configuration selections may be received by corresponding processing units, and thereby may be configured to allocate respective processing units of a respective reconfigurable fabric according to the configuration. Accordingly, various processing units 111 in an integrated circuit may be configured to operate as the circuitry of FIG. 2, thereby mixing the input data with the coefficients as described herein. For example, the electronic device 110 may execute control instructions 113 that implement a configuration for the processing units 111, for example, configuration A for the $t_A$ time period. In accordance with that configuration, the processing units of the electronic device 110 implement a source data processing stage 320. That stage may receive sensor data from the sensor 317. During the $t_A$ time period, the configuring, at block 512, may include writing the data to a memory array coupled with the processing units.

At block 516, the method 500 may include configuring, during a second portion of the time period, the set of processing units with a second configuration that comprises a different configuration selected from the set of configurations for the processing units. As described herein, allocating processing units may include loading certain processing units of electronic device with instructions sets that execute certain processing stages. For example, the electronic device 110 may execute control instructions 113 that implement a configuration for the processing units 111, for example, configuration B for the $t_B$ time period. In accordance with that configuration, the processing units of the electronic device 110 implement a baseband processing stage 325 to receive input data from the memory 340 and generate output data to be stored in the memory 340. That input data may have been processed by the same processing units 111 during a previous portion of the time period, for example, a time period $t_A$. During the $t_B$ time period, the configuring, at block 516, may include reading the data from the memory array to the processing units and, subsequently, after processing at that stage, writing the data to a memory array coupled with the processing units. As can be appreciated, such writing and/or reading may occur for any of the stages with processing units coupled to memory array.

At block 520, the method 500 includes, transmitting a radio frequency (RF) signal that is based at least in part on the data during a third portion of the time period or during a subsequent time period. The data may be output data processed by one or more of the processing stages implemented by the method 500. For example, as described herein, output data from the radio frequency processing stage 335 may be provided to an antenna for wireless, RF transmission. At block 524, the method 500 ends.

The blocks included in the described example methods 500 are for illustration purposes. In some examples, the blocks may be performed in a different order. In some other examples, various blocks may be eliminated. In still other examples, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 6:
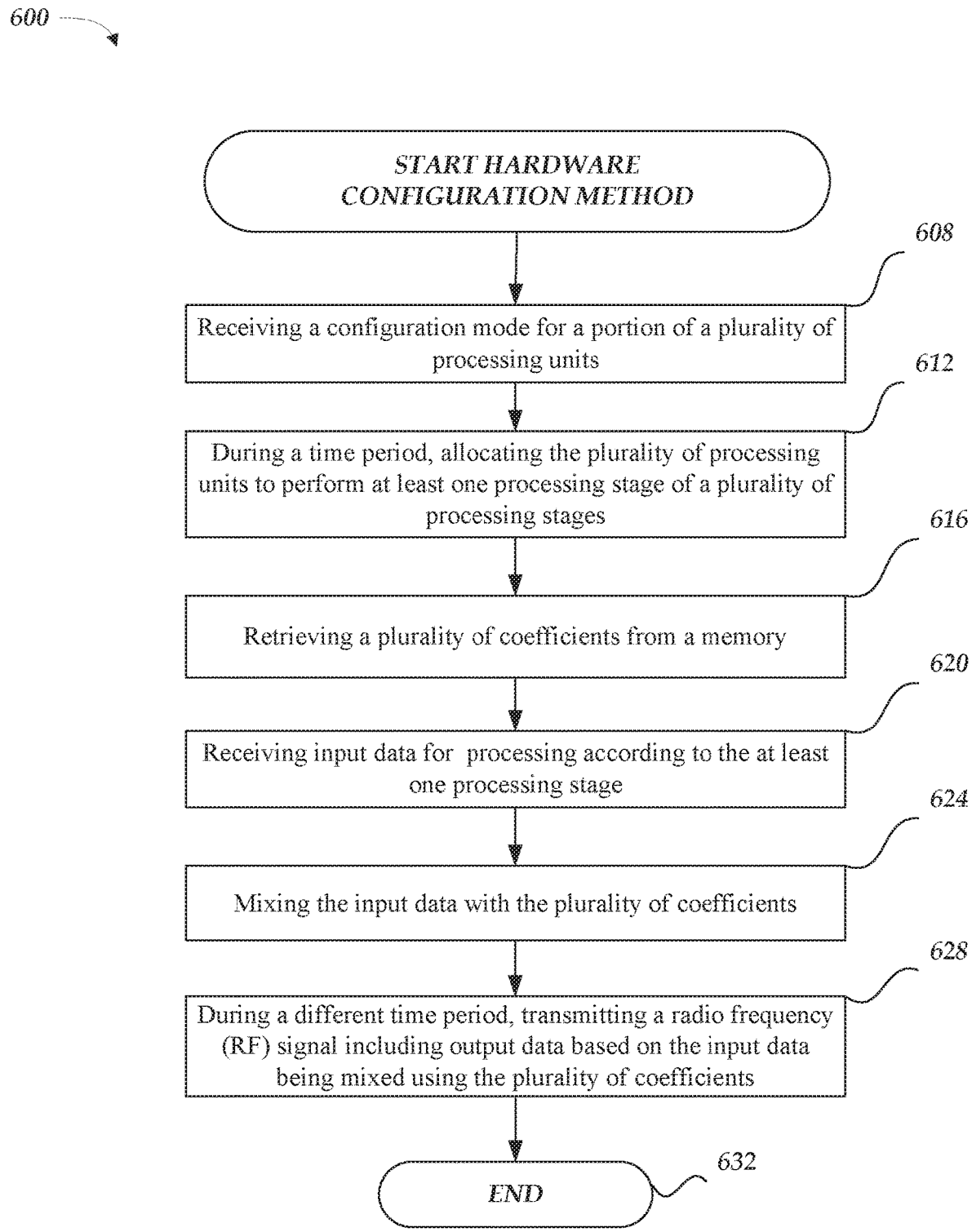
FIG. 6 is a flowchart of a method arranged in accordance with examples described herein.

FIG. 6 is a flowchart of a method 600 in accordance with examples described herein. Example method 600 may be implemented using, for example, computing system 100 in FIG. 1, computing system 200 in FIG. 2, electronic device 300 in FIG. 3, computing system 400 in FIG. 4, or any system or combination of the systems depicted in FIGS. 1-4 described herein. In some examples, the blocks in example method 600 may be performed by a computing system such as a computing system 300 of FIG. 3 implementing processing units in the reconfigurable fabrics therein as a processing unit 205 of FIG. 2. The operations described in blocks 608-632 may also be stored as control instructions in a computer-readable medium at an electronic device 110, 150, or 300, such as control instructions 113, control instructions 163, or memory 340.

Example method 600 may begin the hardware configuration method. At block 608, the method 600 includes receiving a configuration for a portion of a plurality of processing units. Configuration selections may be received by corresponding processing units, and thereby may be configured to allocate respective processing units of a respective reconfigurable fabric according to the configuration. At block 612, the method 600 may include, during a time period, allocating the plurality of processing units to perform at least one processing stage of a plurality of processing stages. As described herein, allocating processing units may include loading certain processing units of electronic device with instructions sets that execute certain processing stages. For example, the electronic device 110 may execute control instructions 113 that implement a configuration for the processing units 111, for example, configuration B for the $t_B$ time period. In accordance with that configuration, the processing units of the electronic device 110 implement a baseband processing stage 325 to receive input data from the memory 340 and generate output data to be stored in the memory 340. The input data may be processed sensor data from the sensor 117 stored in the memory 340. That input data may have been processed by the same processing units 111 during a previous time period, for example, a time period $t_A$.

At block 616, the method 600 includes retrieving a coefficient data from a memory. As described herein, any of the processing units 111 may retrieve coefficients for mixing with input data; for example, utilizing a memory look-up unit. For example, the memory look-up unit may store associations between coefficients and/or configurations described herein. For example, the processing unit may request the coefficients from a memory part of the implementing reconfigurable fabric, from a memory part of an external computing device, or from a memory implemented in a cloud-computing device. In turn, the memory may send the coefficient data as requested by the respective processing units.

At block 620, the method 600 includes receiving input data 210a-c (e.g. X (i,j)) for processing according to at least one processing stage. As described herein, a processing stage may receive input data 210a-c (e.g. X (i,j)). At block 624, the method 600 includes mixing the input data using the coefficient data. The multiplication unit/accumulation units 212a-c, 216a-c multiply two operands from the input data 210a-c to generate a multiplication processing result that is accumulated by the accumulation unit portion of the multiplication unit/accumulation units 212a-c, 216a-c. The multiplication unit/accumulation units 212a-c, 216a-c adds the multiplication processing result to update the processing result stored in the accumulation unit portion, thereby accumulating the multiplication processing result. Accordingly, various processing units 111 in an integrated circuit may be configured to operate as the circuitry of FIG. 2, thereby mixing the input data with the coefficients as described herein. In some examples, various hardware platforms may implement the circuitry of FIG. 2, such as an ASIC, a DSP implemented as part of a FPGA, or a system-on-chip.

At block 628, the method 600 includes, during a different time period, transmitting a radio frequency (RF) signal including output data based on the input data being mixed using the coefficient data. In some examples, the method 600 may repeat until a sequence of configurations has elapsed such that output data is configured to be transmitted at the antenna. As described herein, the output data may be provided to an antenna for wireless, RF transmission. At block 632, the method 600 ends. In some examples, the blocks 608 and 616 may be optional blocks.

The blocks included in the described example methods 600 are for illustration purposes. In some examples, the blocks may be performed in a different order. In some other examples, various blocks may be eliminated. In still other examples, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

Figure 7:
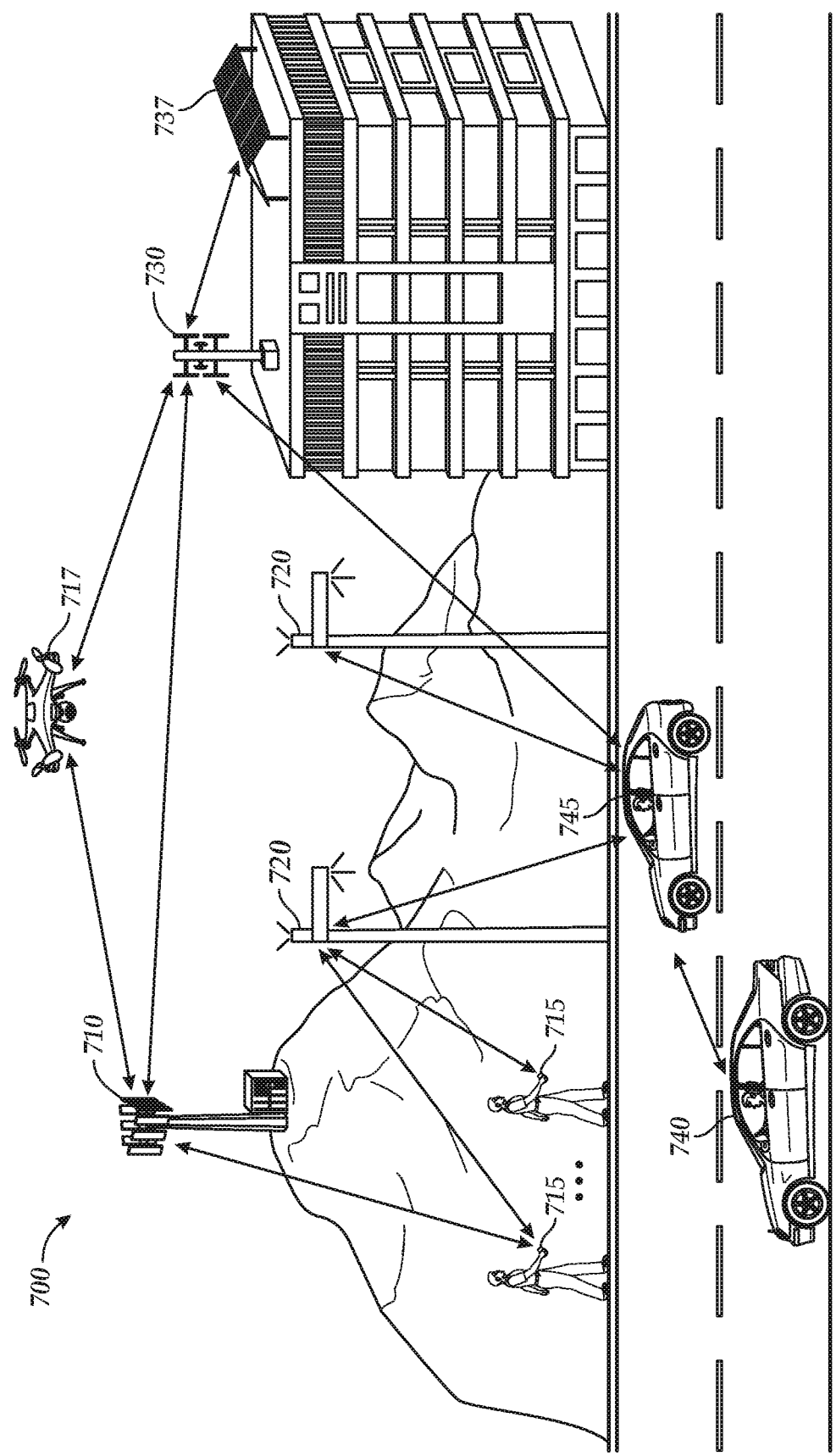
FIG. 7 is a block diagram of a wireless communications system arranged in accordance with aspects of the present disclosure.

FIG. 7 illustrates an example of a wireless communications system 700 in accordance with aspects of the present disclosure. The wireless communications system 700 includes a base station 710, a mobile device 715, a drone 717, a small cell 730, and vehicles 740, 745. The base station 710 and small cell 730 may be connected to a network that provides access to the Internet and traditional communication links. The system 700 may facilitate a wide-range of wireless communications connections in a 5G wireless system that may include various frequency bands, including but not limited to: a sub-6 GHz band (e.g., 700 MHz communication frequency), mid-range communication bands (e.g., 2.4 GHz), and mmWave bands (e.g., 24 GHz).

Additionally or alternatively, the wireless communications connections may support various modulation schemes, including but not limited to: filter bank multi-carrier (FBMC), the generalized frequency division multiplexing (GFDM), universal filtered multi-carrier (UFMC) transmission, bi-orthogonal frequency division multiplexing (BFDM), sparse code multiple access (SCMA), non-orthogonal multiple access (NOMA), multi-user shared access (MUSA), and faster-than-Nyquist (FTN) signaling with time-frequency packing. Such frequency bands and modulation techniques may be a part of a standards framework, such as Long Term Evolution (LTE) or other technical specification published by an organization like 3GPP or IEEE, which may include various specifications for subcarrier frequency ranges, a number of subcarriers, uplink/downlink transmission speeds, TDD/FDD, and/or other aspects of wireless communication protocols.

The system 700 may depict aspects of a radio access network (RAN), and system 700 may be in communication with or include a core network (not shown). The core network may include one or more serving gateways, mobility management entities, home subscriber servers, and packet data gateways. The core network may facilitate user and control plane links to mobile devices via the RAN, and it may be an interface to an external network (e.g., the Internet). Base stations 710, communication devices 720, and small cells 730 may be coupled with the core network or with one another, or both, via wired or wireless backhaul links (e.g., Si interface, X2 interface, etc.).

The system 700 may provide communication links connected to devices or "things," such as sensor devices, e.g., solar cells 737, to provide an Internet of Things ("IoT") framework. Connected things within the IoT may operate within frequency bands licensed to and controlled by cellular network service providers, or such devices or things may. Such frequency bands and operation may be referred to as narrowband IoT (NB-IoT) because the frequency bands allocated for IoT operation may be small or narrow relative to the overall system bandwidth. Frequency bands allocated for NB-IoT may have bandwidths of 50, 100, or 200 KHz, for example.

Additionally or alternatively, the IoT may include devices or things operating at different frequencies than traditional cellular technology to facilitate use of the wireless spectrum. For example, an IoT framework may allow multiple devices in system 700 to operate at a sub-6 GHz band or other industrial, scientific, and medical (ISM) radio bands where devices may operate on a shared spectrum for unlicensed uses. The sub-6 GHz band may also be characterized as and may also be characterized as an NB-IoT band. For example, in operating at low frequency ranges, devices providing sensor data for "things," such as solar cells 737, may utilize less energy, resulting in power-efficiency and may utilize less complex signaling frameworks, such that devices may transmit asynchronously on that sub-6 GHz band. The sub-6 GHz band may support a wide variety of uses case, including the communication of sensor data from various sensors devices. Examples of sensor devices include sensors for detecting energy, heat, light, vibration, biological signals (e.g., pulse, EEG, EKG, heart rate, respiratory rate, blood pressure), distance, speed, acceleration, or combinations thereof. Sensor devices may be deployed on buildings, individuals, and/or in other locations in the environment. The sensor devices may communicate with one another and with computing systems which may aggregate and/or analyze the data provided from one or multiple sensor devices in the environment. Such data may be used to indicate an environmental characteristic of the sensor.

In such a 5G framework, devices may perform functionalities performed by base stations in other mobile networks (e.g., UMTS or LTE), such as forming a connection or managing mobility operations between nodes (e.g., handoff or reselection). For example, mobile device 715 may receive sensor data from the user utilizing the mobile device 715, such as blood pressure data, and may transmit that sensor data on a narrowband IoT frequency band to base station 710. In such an example, some parameters for the determination by the mobile device 715 may include availability of licensed spectrum, availability of unlicensed spectrum, and/or time-sensitive nature of sensor data. Continuing in the example, mobile device 715 may transmit the blood pressure data because a narrowband IoT band is available and can transmit the sensor data quickly, identifying a time-sensitive component to the blood pressure (e.g., if the blood pressure measurement is dangerously high or low, such as systolic blood pressure is three standard deviations from norm).

Additionally or alternatively, mobile device 715 may form device-to-device (D2D) connections with other mobile devices or other elements of the system 700. For example, the mobile device 715 may form RFID, WiFi, MultiFire, Bluetooth, or Zigbee connections with other devices, including communication device 720 or vehicle 745. In some examples, D2D connections may be made using licensed spectrum bands, and such connections may be managed by a cellular network or service provider. Accordingly, while the above example was described in the context of narrowband IoT, it can be appreciated that other device-to-device connections may be utilized by mobile device 715 to provide information (e.g., sensor data) collected on different frequency bands than a frequency band determined by mobile device 715 for transmission of that information.

Moreover, some communication devices may facilitate ad-hoc networks, for example, a network being formed with communication devices 720 attached to stationary objects) and the vehicles 740, 745, without a traditional connection to a base station 710 and/or a core network necessarily being formed. Other stationary objects may be used to support communication devices 720, such as, but not limited to, trees, plants, posts, buildings, blimps, dirigibles, balloons, street signs, mailboxes, or combinations thereof. In such a system 700, communication devices 720 and small cell 730 (e.g., a small cell, femtocell, WLAN access point, cellular hotspot, etc.) may be mounted upon or adhered to another structure, such as lampposts and buildings to facilitate the formation of ad-hoc networks and other IoT-based networks. Such networks may operate at different frequency bands than existing technologies, such as mobile device 715 communicating with base station 710 on a cellular communication band.

The communication devices 720 may form wireless networks, operating in either a hierarchal or ad-hoc network fashion, depending, in part, on the connection to another element of the system 700. For example, the communication devices 720 may utilize a 700 MHz communication frequency to form a connection with the mobile device 715 in an unlicensed spectrum, while utilizing a licensed spectrum communication frequency to form another connection with the vehicle 745. Communication devices 720 may communicate with vehicle 745 on a licensed spectrum to provide direct access for time-sensitive data, for example, data for an autonomous driving capability of the vehicle 745 on a 5.9 GHz band of Dedicated Short Range Communications (DSRC).

Vehicles 740 and 745 may form an ad-hoc network at a different frequency band than the connection between the communication device 720 and the vehicle 745. For example, for a high bandwidth connection to provide time-sensitive data between vehicles 740, 745, a 24 GHz mmWave band may be utilized for transmissions of data between vehicles 740, 745. For example, vehicles 740, 745 may share real-time directional and navigation data with each other over the connection while the vehicles 740, 745 pass each other across a narrow intersection line. Each vehicle 740, 745 may be tracking the intersection line and providing image data to an image processing algorithm to facilitate autonomous navigation of each vehicle while each travels along the intersection line. In some examples, this real-time data may also be substantially simultaneously shared over an exclusive, licensed spectrum connection between the communication device 720 and the vehicle 745, for example, for processing of image data received at both vehicle 745 and vehicle 740, as transmitted by the vehicle 740 to vehicle 745 over the 24 GHz mmWave band. While shown as automobiles in FIG. 7, other vehicles may be used including, but not limited to, aircraft, spacecraft, balloons, blimps, dirigibles, trains, submarines, boats, ferries, cruise ships, helicopters, motorcycles, bicycles, drones, or combinations thereof.

While described in the context of a 24 GHz mmWave band, it can be appreciated that connections may be formed in the system 700 in other mmWave bands or other frequency bands, such as 28 GHz, 37 GHz, 38 GHz, 39 GHz, which may be licensed or unlicensed bands. In some cases, vehicles 740, 745 may share the frequency band that they are communicating on with other vehicles in a different network. For example, a fleet of vehicles may pass vehicle 740 and, temporarily, share the 24 GHz mmWave band to form connections among that fleet, in addition to the 24 GHz mmWave connection between vehicles 740, 745. As another example, communication device 720 may substantially simultaneously maintain a 700 MHz connection with the mobile device 715 operated by a user (e.g., a pedestrian walking along the street) to provide information regarding a location of the user to the vehicle 745 over the 5.9 GHz band. In providing such information, communication device 720 may leverage antenna diversity schemes as part of a massive MIMO framework to facilitate time-sensitive, separate connections with both the mobile device 715 and the vehicle 745. A massive MIMO framework may involve a transmitting and/or receiving devices with a large number of antennas (e.g., 12, 20, 64, 128, etc.), which may facilitate precise beamforming or spatial diversity unattainable with devices operating with fewer antennas according to legacy protocols (e.g., WiFi or LTE).

The base station 710 and small cell 730 may wirelessly communicate with devices in the system 700 or other communication-capable devices in the system 700 having at the least a sensor wireless network, such as solar cells 737 that may operate on an active/sleep cycle, and/or one or more other sensor devices. The base station 710 may provide wireless communications coverage for devices that enter its coverages area, such as the mobile device 715 and the drone 717. The small cell 730 may provide wireless communications coverage for devices that enter its coverage area, such as near the building that the small cell 730 is mounted upon, such as vehicle 745 and drone 717.

Generally, the small cell 730 may be referred to as a small cell and provide coverage for a local geographic region, for example, coverage of 200 meters or less in some examples. This may be contrasted with a macrocell, which may provide coverage over a wide or large area on the order of several square miles or kilometers. In some examples, a small cell 730 may be deployed (e.g., mounted on a building) within some coverage areas of a base station 710 (e.g., a macrocell) where wireless communications traffic may be dense according to a traffic analysis of that coverage area. For example, a small cell 730 may be deployed on the building in FIG. 7 in the coverage area of the base station 710 if the base station 710 generally receives and/or transmits a higher amount of wireless communication transmissions than other coverage areas of that base station 710. A base station 710 may be deployed in a geographic area to provide wireless coverage for portions of that geographic area. As wireless communications traffic becomes denser, additional base stations 710 may be deployed in certain areas, which may alter the coverage area of an existing base station 710, or other support stations may be deployed, such as a small cell 730. Small cell 730 may be a femtocell, which may provide coverage for an area smaller than a small cell (e.g., 100 meters or less in some examples (e.g., one story of a building)).

While base station 710 and small cell 730 may provide communication coverage for a portion of the geographical area surrounding their respective areas, both may change aspects of their coverage to facilitate faster wireless connections for certain devices. For example, the small cell 730 may primarily provide coverage for devices surrounding or in the building upon which the small cell 730 is mounted. However, the small cell 630 may also detect that a device has entered is coverage area and adjust its coverage area to facilitate a faster connection to that device.

For example, a small cell 730 may support a massive MIMO connection with the drone 717, which may also be referred to as an unmanned aerial vehicle (UAV), and, when the mobile device 715 enters it coverage area, the small cell 730 adjusts some antennas to point directionally in a direction of the vehicle 745, rather than the drone 717, to facilitate a massive MIMO connection with the vehicle, in addition to the drone 717. In adjusting some of the antennas, the small cell 730 may not support as fast as a connection to the drone 717, as it had before the adjustment. However, the drone 717 may also request a connection with another device (e.g., base station 710) in its coverage area that may facilitate a similar connection as described with reference to the small cell 730, or a different (e.g., faster, more reliable) connection with the base station 710. Accordingly, the small cell 730 may enhance existing communication links in providing additional connections to devices that may utilize or demand such links. For example, the small cell 730 may include a massive MIMO system that directionally augments a link to vehicle 745, with antennas of the small cell directed to the vehicle 745 for a specific time period, rather than facilitating other connections (e.g., the small cell 730 connections to the base station 710, drone 717, or solar cells 737). In some examples, drone 717 may serve as a movable or aerial base station.

The wireless communications system 700 may include devices such as base station 710, communication device 720, and small cell 730 that may support several connections to devices in the system 700. Such devices may operate in a hierarchal mode or an ad-hoc mode with other devices in the network of system 700. While described in the context of a base station 710, communication device 720, and small cell 730, it can be appreciated that other devices that can support several connections with devices in the network may be included in system 700, including but not limited to: macrocells, femtocells, routers, satellites, and RFID detectors.

In various examples, the elements of wireless communication system 700, such as the drone 717 and the solar cells 737, may be implemented utilizing the systems, apparatuses, and methods described herein. For example, the computing system 100 implementing the electronic device 110 as the electronic device 300, may be implemented in any of the elements of communication system 700. For example, the solar cells 737 may be implemented as the electronic device 300. In the example, the drone 717 and the solar cells 737 may be implemented as the electronic device 110 and the electronic device 150 communicating over narrowband IoT channels. The drone 717, being implemented as the electronic device 110, may include a sensor to detect various aerodynamic properties of the drone 717 traveling through the air space. For example, the drone 717 may include sensors to detect wind direction, airspeed, or any other sensor generally included vehicles with aerodynamic properties. The drone 717 may provide the sensor data to processing units 111 that are configured to operate for an active time period and process the sensor data over a sequence of configurations partly based on a clock signal (e.g., GMT time) that the drone 717 receives from the base station 710. The drone 717 transmits an RF signal via the antenna 101 to the base station 710 with the sensor data that was processed by the processing units 111 implementing various processing stages, as described herein. Accordingly, the drone 717 may utilize less die space on a silicon chip than conventional signal processing systems and techniques that can include additional hardware or specially-designed hardware, thereby allowing the drone 717 to be of smaller size compared to drones having such conventional signal processing systems and techniques.

In the example, the solar cells 737, being implemented as the electronic device 150, may include a photoelectric sensor to detect light on the solar cells 737. The solar cells 737 may provide that sensor data to processing units 161 that are configured to operate for an active time period and process the sensor data over a sequence of configurations. For example, during the source data processing stage 320 for the time period $t_A$, the processing units 161 may implement the source data processing stage 320 to sample and convert the electrical representations of the sensor data into a sampled digital signal, including coding that digital signal. After further processing of that digital signal at the baseband processing stage 325, the digital front-end processing stage 330, and the RF processing stage 335 for time periods $t_B$, $t_C$, the solar cells 737 transmit an RF signal via the antennas 151, 157 to the small cell 730 that is configured to receive a MIMO signal.

Additionally or alternatively, while described in the examples above in the context of the drone 717 and the solar cells 737, the elements of communication system 700 may be implemented as part of any of the computing systems disclosed herein, including: computing system 100 in FIG. 1, computing system 200 in FIG. 2, electronic device 300 in FIG. 3, computing system 400 in FIG. 4, or any system or combination of the systems depicted in FIGS. 1-4 described herein.

Figure 8:
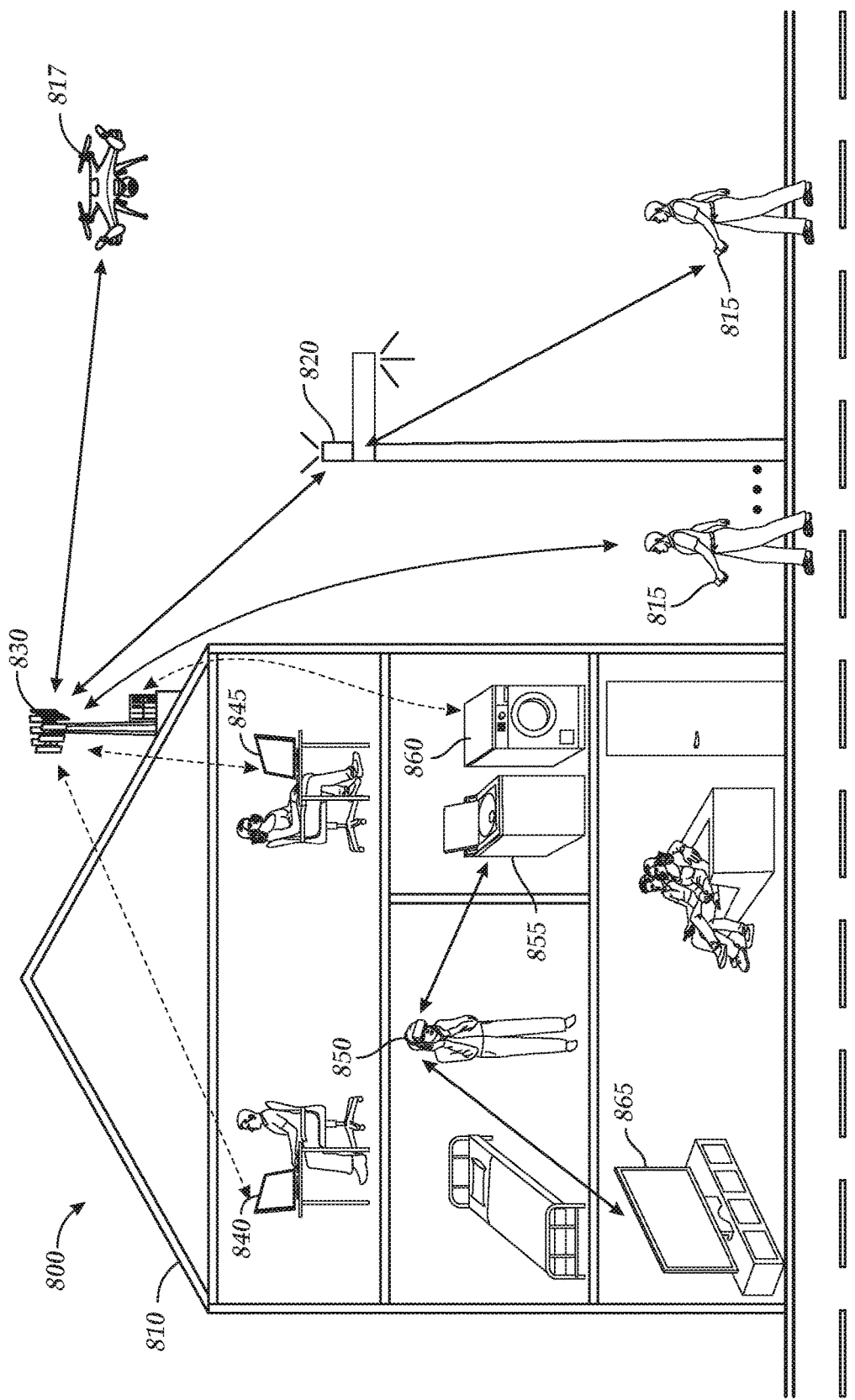
FIG. 8 is a block diagram of a wireless communications system arranged in accordance with aspects of the present disclosure.

FIG. 8 illustrates an example of a wireless communications system 800 in accordance with aspects of the present disclosure. The wireless communications system 800 includes a mobile device 815, a drone 817, a communication device 820, and a small cell 830. A building 810 also includes devices of the wireless communications system 800 that may be configured to communicate with other elements in the building 810 or the small cell 830. The building 810 includes networked workstations 840, 845, virtual reality device 850, IoT devices 855, 860, and networked entertainment device 865. In the depicted wireless communications system 800, IoT devices 855, 860 may be a washer and dryer, respectively, for residential use, being controlled by the virtual reality device 850. Accordingly, while the user of the virtual reality device 850 may be in different room of the building 810, the user may control an operation of the IoT device 855, such as configuring a washing machine setting. Virtual reality device 850 may also control the networked entertainment device 865. For example, virtual reality device 850 may broadcast a virtual game being played by a user of the virtual reality device 850 onto a display of the networked entertainment device 865.

The small cell 830 or any of the devices of building 810 may be connected to a network that provides access to the Internet and traditional communication links. Like the system 700, the wireless communications system 800 may facilitate a wide-range of wireless communications connections in a 5G system that may include various frequency bands, including but not limited to: a sub-6 GHz band (e.g., 700 MHz communication frequency), mid-range communication bands (e.g., 2.4 GHz), and mmWave bands (e.g., 24 GHz). Additionally or alternatively, the wireless communications connections may support various modulation schemes as described above with reference to system 700. Wireless communications system 800 may operate and be configured to communicate analogously to system 700. Accordingly, similarly numbered elements of wireless communications system 800 and system 700 may be configured in an analogous way, such as communication device 720 to communication device, small cell 730 to small cell 830, etc.

Like the system 700, where elements of system 700 are configured to form independent hierarchal or ad-hoc networks, communication device 820 may form a hierarchal network with small cell 830 and mobile device 815, while an additional ad-hoc network may be formed among the small cell 830 network that includes drone 817 and some of the devices of the building 810, such as networked workstations 840, 845 and IoT devices 855, 860.

Devices in wireless communications system 800 may also form (D2D) connections with other mobile devices or other elements of the wireless communications system 800. For example, the virtual reality device 850 may form a narrowband IoT connections with other devices, including IoT device 855 and networked entertainment device 865. As described above, in some examples, D2D connections may be made using licensed spectrum bands, and such connections may be managed by a cellular network or service provider. Accordingly, while the above example was described in the context of a narrowband IoT, it can be appreciated that other device-to-device connections may be utilized by virtual reality device 850.

In various examples, the elements of wireless communications system 800, such as the mobile device 815, the drone 817, the communication device 820, the small cell 730, the networked workstations 840, 845, the virtual reality device 850, the IoT devices 855, 860, and the networked entertainment device 865, may be implemented as part of any of the computing system 100 in FIG. 1, computing system 200 in FIG. 2, electronic device 300 in FIG. 3, computing system 400 in FIG. 4, or any system or combination of the systems depicted in FIGS. 1-4 described herein.

For example, the IoT device 860 may be implemented as the electronic device 300. The IoT device 855 may include a sensor to detect various aerodynamic properties of the drone 717 traveling through the air space. For example, the drone 817 may include a moisture sensor to detect a level of moisture of clothes in a residential dryer, such as IoT device 860. The IoT device 860 may provide the sensor data to processing units 111 that are configured to operate for an active time period and process the sensor data over a sequence of configurations partly based on a clock signal (e.g., a timer of virtual reality device 850) that the IoT device 860 receives from the virtual reality device 850 over a D2D connection. The IoT device 860 transmits a narrowband RF signal via the antenna 101 to the virtual reality device 850 with the sensor data that was processed by the processing units 111 implementing various processing stages, as described herein. The virtual reality device 850, receiving the narrowband RF signal, may display a visual representation of the drying status, such as a percentage bar, on an icon on a display of the virtual reality device 850, thereby updating the user of the virtual reality device 850 as to a status of the user's clothes in the IoT device 860. In implementing the electronic device 300 as part of the IoT device 860, the IoT device 860 may utilize less power, with the processing units 111 being active only during active time periods, thereby saving power during inactive periods.

Additionally or alternatively, while described in the examples above in the context of the IoT device 860, the elements of communication system 800 may be implemented as part of any of the computing systems disclosed herein, including: computing system 100 in FIG. 1, computing system 200 in FIG. 2, electronic device 300 in FIG. 3, computing system 400 in FIG. 4, or any system or combination of the systems depicted in FIGS. 1-4 described herein.

Certain details are set forth above to provide a sufficient understanding of described examples. However, it will be clear to one skilled in the art that examples may be practiced without various of these particular details. The description herein, in connection with the appended drawings, describes example configurations and does not represent all the examples that may be implemented or that are within the scope of the claims. The terms "exemplary" and "example" as may be used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Techniques described herein may be used for various wireless communications systems, which may include multiple access cellular communication systems, and which may employ code division multiple access (CDMA), time division multiple access (TDMA), frequency division multiple access (FDMA), orthogonal frequency division multiple access (OFDMA), or single carrier frequency division multiple access (SC-FDMA), or any a combination of such techniques. Some of these techniques have been adopted in or relate to standardized wireless communication protocols by organizations such as Third Generation Partnership Project (3GPP), Third Generation Partnership Project 2 (3GPP2) and IEEE. These wireless standards include Ultra Mobile Broadband (UMB), Universal Mobile Telecommunications System (UMTS), Long Term Evolution (LTE), LTE-Advanced (LTE-A), LTE-A Pro, New Radio (NR), IEEE 802.11 (WiFi), and IEEE 802.16 (WiMAX), among others.

The terms "5G" or "5G communications system" may refer to systems that operate according to standardized protocols developed or discussed after, for example, LTE Releases 13 or 14 or WiMAX 802.16e-2005 by their respective sponsoring organizations. The features described herein may be employed in systems configured according to other generations of wireless communication systems, including those configured according to the standards described above.

The various illustrative blocks and modules described in connection with the disclosure herein may be implemented or performed with a general-purpose processor, a digital signal processor (DSP), an application-specific integrated circuit (ASIC), a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), or optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Combinations of the above are also included within the scope of computer-readable media.

Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Also, as used herein, including in the claims. "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

From the foregoing it will be appreciated that, although specific examples have been described herein for purposes of illustration, various modifications may be made while remaining with the scope of the claimed technology. The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
receiving signaling indicative of first data during a first portion of a time period;
processing the first data during the first portion of the time period to generate second data using a first configuration of processing units selected from a set of configurations for the processing units;
processing the second data during a second portion of the time period to generate third data using a second configuration of the processing units that comprises a different configuration selected from the set of configurations for the processing units;
processing the third data during a third portion of the time period to generate a radio frequency (RF) signal using a third configuration of the processing units that comprises a different configuration selected from the set of configurations for the processing units;
transmitting, during the third portion of the time period or during a subsequent time period, the RF signal that is based at least in part on the data; and
providing the signaling indicative of the first data from a sensor detecting an environmental characteristic;
wherein at least one of the processing units comprises a plurality of multiplication units or accumulation units that are configured to communicate with a plurality of memory look up units to generate output data.

2. The method of claim 1, further comprising:
writing the second data to a memory array coupled with the processing units during the first portion of the time period; and
reading the second data from the memory array coupled with the processing units during the second portion of the time period.

3. The method of claim 1, further comprising:
processing the third data during the third portion of the time period to generate fourth data using a fourth configuration that comprises a different configuration selected from the set of configurations for the processing units, and wherein processing the third data during the third portion of the time period to generate the RF signal comprises processing the fourth data during the third portion of the time period to generate the RF signal using the third configuration of the processing units.

4. The method of claim 3, further comprising:
writing the third data to a memory array coupled with the processing units during the second portion of the time period; and
reading the third data from the memory array to the processing units during the third portion of the time period.

5. The method of claim 3, further comprising:
amplifying the fourth data using an RF amplifier.

6. The method of claim 3, wherein the third configuration and the fourth configuration corresponds to a digital front-end processing stage and radio frequency processor stage, respectively.

7. The method of claim 1, wherein the first configuration corresponds to a source data processor stage, wherein the second configuration corresponds to a baseband processor stage.

8. The method of claim 1, wherein transmitting the RF signal comprises transmitting the RF signal at a frequency band corresponding to at least one of 1 MHz, 5 MHz, 10 MHz, 20 MHz, 700 MHz, 2.4 GHz, or 24 GHz.

9. The method of claim 1, wherein the first time period comprises an active time period of a discontinuous reception (DRX) or discontinuous transmission (DTX) cycle.

10. The method of claim 9, wherein the DRX or DTX cycle comprises an inactive time period designated for powering down one or more components of a device operation according to the DRX or DTX cycle.

11. An apparatus comprising:
a sensor configured to receive input data;
an antenna configured to transmit a radio frequency (RF) signal that is based at least in part on the input data;
a plurality of processing units coupled with the sensor and operable, during at least one portion of an active time period, in each configuration of a set of configurations for the plurality of processing units; and
a memory array coupled with the plurality of processing units and configured to write output data to and read the output data from the plurality of processing units during a plurality of time portion of the active time period,
wherein at least one of the plurality of processing units comprises a plurality of multiplication units or accumulation units that are configured to communicate with a plurality of memory look up units to generate output data.

12. The apparatus of claim 11, further comprising:
a processing unit of the plurality of processing units, the processing unit comprising:
a multiplication unit configured to multiply a portion of the input with coefficient data to generate a processing result; and
an accumulation unit configured to accumulate at least the processing result to generate the output data.

13. The apparatus of claim 11, further comprising:
a processor configured to detect that the time period has elapsed based on a clock signal and provide an additional configuration selection including information indicative of an additional configuration associated with an additional processing stage of the plurality of processing stages and associated with an additional time period of the active time period,
wherein, during the additional time period, the processor is further configured to allocate a portion of the plurality of processing units to perform the additional processing stage according to the additional configuration.

14. The apparatus of claim 13, wherein the multiplication unit further configured to multiply the output data with additional coefficient data to generate an additional processing result, and wherein the accumulation unit further configured to accumulate at least the additional processing result to generate additional output data.

15. The apparatus of claim 13, wherein the configuration corresponds to at least one of a source data processor stage or a baseband processor stage, and wherein the additional configuration corresponds to at least one of the baseband processor stage or a digital front-end and radio frequency processor stage.

16. The apparatus of claim 11, wherein at least one of the plurality of processing units, or the antenna is configured to operate in accordance with a wireless communication protocol that employs at least one of GFDM, FBMC, UFMC, DFDM, SCMA, NOMA, MUSA, or FTN, or any combination thereof.

17. The apparatus of claim 11, wherein the plurality of processing units comprise components of at least one of a base station, small cell, mobile device, drone, communication device, a vehicle communication device, or a device configured to operate on a narrowband Internet of Things (IoT) frequency band.

18. A non-transitory computer readable medium comprising instructions executable to cause a wireless communication device to:
receive signaling indicative of data during a first portion of a time period;
configure, during the first portion of the time period, a set of processing units with a first configuration selected from a set of configurations for the processing units;
configure, during a second portion of the time period, the set of processing units with a second configuration that comprises a different configuration selected from the set of configurations for the processing units;
process the data during a third portion of the time period using a third configuration that comprises a different configuration selected from the set of configurations for the processing units; and
transmit a radio frequency (RF) signal that is based at least in part on the data during the third portion of the time period or during a subsequent time period; and
provide the signaling indicative of the first data from a sensor detecting an environmental characteristic.

19. The non-transitory computer readable medium of claim 18, further comprising instructions executable to cause the wireless communication device to:
write the data to a memory array coupled with the processing units during the first portion of the time period; and
read the data from the memory array coupled with the processing units during the second portion of the time period.

20. The non-transitory computer readable medium of claim 18, further comprising instructions executable to cause the wireless communication device to:
write the data to a memory array coupled with the processing units during the second portion of the time period; and
read the data from the memory array to the processing units during the third portion of the time period.

21. The method of claim 1, wherein the transmitting is responsive to control instructions.

22. The apparatus of claim 11, wherein the input data is indicative of an environmental characteristic.

23. The method of claim 1, wherein the sensor utilizes a detecting mechanism including electrical, chemical, mechanical, or any combination thereof in detecting an environmental characteristic.

24. The non-transitory computer readable medium of claim 18, wherein at least one of the processing units comprises a plurality of multiplication units or accumulation units that are configured to communicate with a plurality of memory look up units to generate output data.

* * * * *